Figure 1:
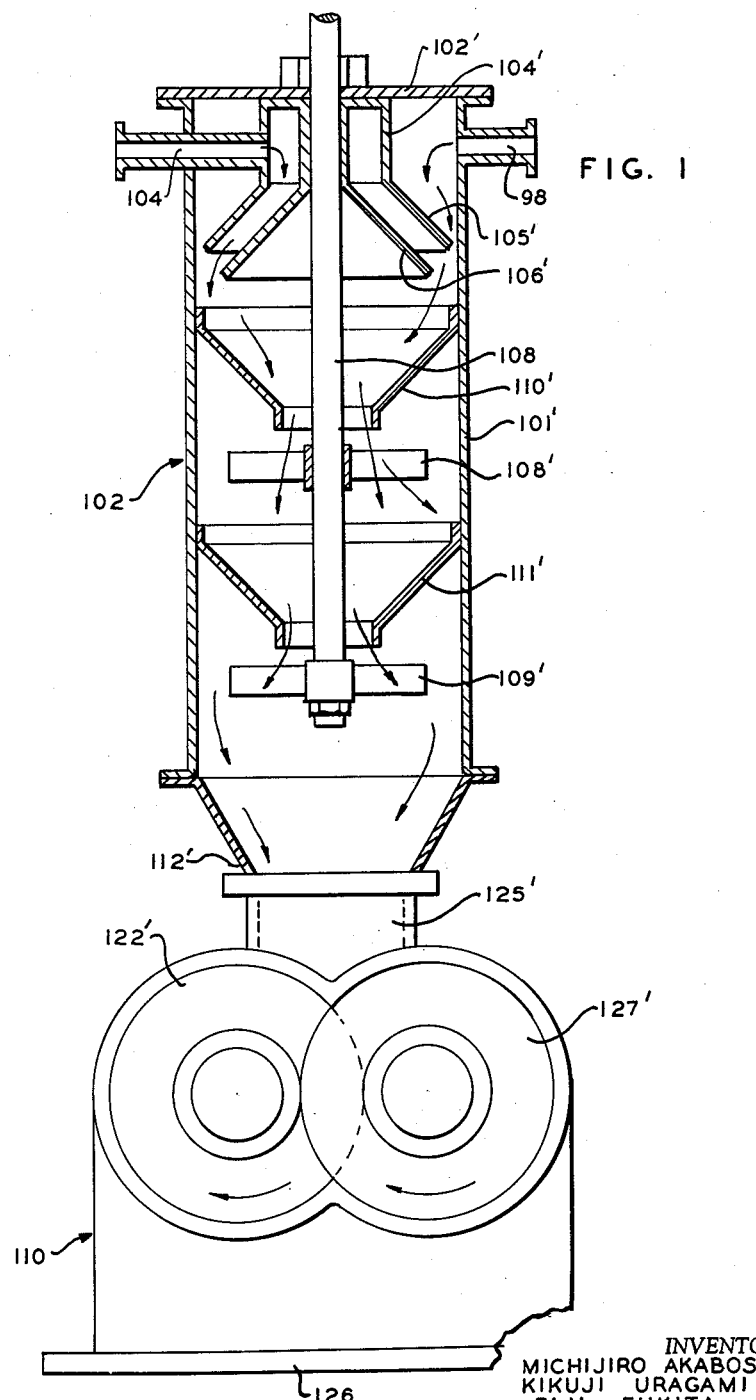

Jan. 8, 1963   MICHIJIRO AKABOSHI ETAL   3,072,624
SAPONIFICATION PROCESS FOR PREPARATION OF POLYVINYL ALCOHOL
Filed Dec. 29, 1959   2 Sheets-Sheet 1

INVENTORS
MICHIJIRO AKABOSHI
KIKUJI URAGAMI
EIJI FUKITA
BY AKIMASA FUKAI

William C. Long
ATTORNEY

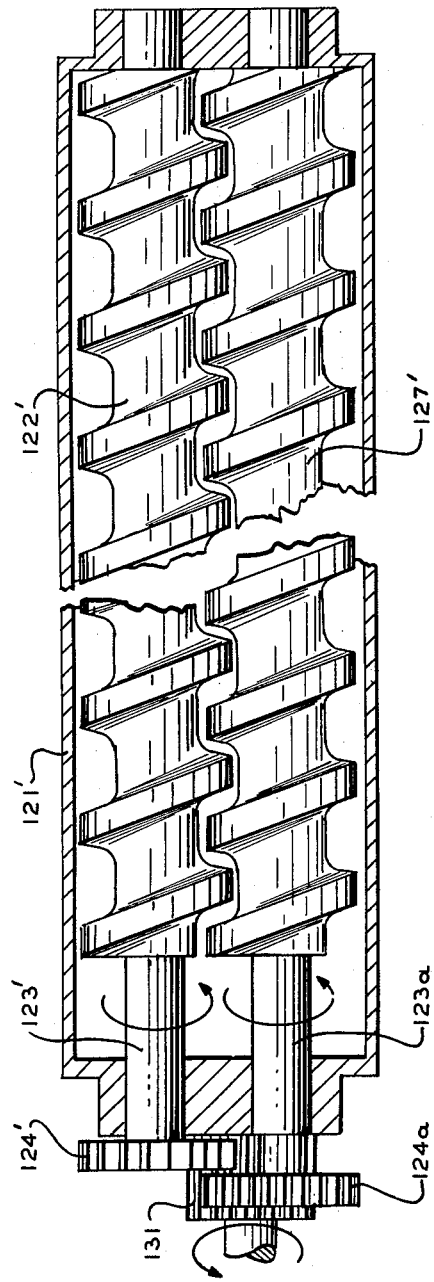

United States Patent Office 3,072,624
Patented Jan. 8, 1963

3,072,624
SAPONIFICATION PROCESS FOR PREPARATION OF POLYVINYL ALCOHOL
Michijiro Akaboshi, Moto-machi, Toyonaka City, Kikuji Uragami, Toyama City, Eiji Fukita, Sakazu, Kurashiki City, and Akimasa Fukai, Toyama City, Japan, assignors to Kurashiki Rayon Co., Ltd., Okayama Prefecture, Japan, a corporation of Japan
Filed Dec. 29, 1959, Ser. No. 862,564
5 Claims. (Cl. 260—91.3)

This invention relates to the production of polyvinyl alcohol by the saponification of polyvinyl acetate and is more particularly concerned with a process for continuously effecting such saponification.

Saponification or, more properly, "alcoholysis" of polyvinyl acetate to form polyvinyl alcohol is effected by bringing a mixture of polyvinyl acetate and methanol into intimate admixture with a saponification catalyst in aqueous or alcohol solution. The reaction may be illustrated generally by the following equation:

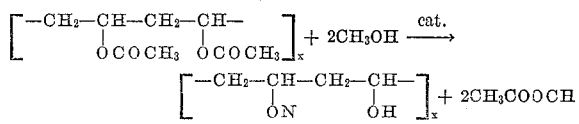

Polyvinyl acetate is produced in accordance with well known procedures by the polymerization of vinyl acetate and it has previously been proposed to convert polyvinyl acetate into polyvinyl alcohol by saponification or alcoholysis but difficulties have been experienced in this step by reason of the nature of the materials involved. When a polyvinyl acetate solution is mixed with an alkaline catalyst solution to effect the desired conversion to polyvinyl alcohol, the mixed solution becomes pasty as the reaction proceeds and eventually increases in viscosity to a substantial degree and tends to stick to the inside wall of reaction chamber or to the blades of the agitator and difficulty in operation is encountered. As a result, previous efforts to achieve a truly continuous process for effecting saponification or alcoholysis of polyvinyl acetate have not generally been successful. Similarly, serious difficulties have heretofore been experienced in obtaining a high percentage of conversion to polyvinyl alcohol.

It is an object of the present invention to provide a continuous process for the conversion of polyvinyl acetate into polyvinyl alcohol.

It is another object of the invention to provide a continuous process of the character indicated by means of which a high percentage of conversion to polyvinyl alcohol can be readily achieved.

In accordance with the invention, the polyvinyl acetate solution and the catalyst solution are initially combined and saponification is initiated by causing one of the solutions to flow continuously along the wall of a mixing zone in the form of a thin layer, and at the same time the other solution is also disposed in the form of a thin film and in this form is mixed with the first solution. The mixed films are then repeatedly dispersed and caused to flow along downwardly inclined surfaces. After this initial intimate mixing operation, the partially saponified mass, which now tends to increase in viscosity and to become adhesive, is passed into an inlet end of a saponification zone wherein the mass as it becomes solid and adhesive is propelled toward an outlet end over surfaces which are continuously wiped as the mass is further mixed, and the saponified mass is eventually discharged from the outlet end.

It is a feature of the invention that the interaction between the polyvinyl acetate and the catalyst is carried out in such manner that sticking is avoided and smooth flow of materials is achieved.

It is another feature of the invention that the sequence of steps characteristic of the process result in a high conversion to polyvinyl alcohol so that the saponified product which is produced has a very low percentage of acetyl groups.

Other objects and features of the invention will be apparent as the description of the invention proceeds and from the accompanying drawing which shows a typical apparatus in which the process of the invention may be carried out. In the drawing, FIG. 1 is a vertical elevational view, partly in section to show details of the portion of the apparatus providing the mixing zone; and FIG. 2 is a horizontal sectional view of the lower portion of the apparatus shown in FIG. 1 taken approximately at right angles to the plane of FIG. 1 and showing the portion of the apparatus which provides the saponification zone proper.

The catalyst used is suitably alkaline in nature, and preferably is an alkali metal hydroxide, such as sodium hydroxide. The polyvinyl acetate as it is produced by known procedures is generally too viscous for efficient saponification and before it is introduced into the mixing zone with the saponification catalyst, it is mixed with sufficient quantities of methanol to produce a solution of 10 to 70 weight percent concentration, preferably a concentration of about 15 to 30%, e.g. about 20 weight percent. The catalyst, e.g. sodium hydroxide, is suitably introduced as either an aqueous solution or a methanolic solution, having a concentration of 1 to 30 weight percent. The proportion of catalyst to polyvinyl acetate is suitably 0.001 to 0.25% based on the mole weights of the catalyst and the polyvinyl acetate.

In the mixing or blending zone, the stream of polyvinyl acetate paste and the stream of saponification catalyst are combined and thoroughly agitated and then the mixture is passed directly into the communicating saponification zone proper wherein the saponification reaction is promoted by further mixing the catalyst and the polyvinyl acetate paste at a temperature of 25 to 60° C. with concurrent positive propulsion of the saponified mass through the saponification zone. The effluent from the saponification zone, which is substantially a solid mass, is then passed to a crusher wherein the polyvinyl alcohol mass is crushed and sub-divided and the mass is then filtered and eventually dried by means of known procedures which form no part of the present invention.

When the solution of polyvinyl acetate in methanol is mixed with the sodium hydroxide solution, the two solutions maintain the liquid phase in which they are mixed for about ten seconds from the first moment of mixing, and the viscosity of the solution actually becomes lower for a short time thereafter. However, it then gradually becomes higher as mixing is continued and the liquid phase passes into a pasty phase and then into a substantially solid phase which has adhesive characteristics. The complete change to a solid polyvinyl alcohol thus occurs within a period of a few minutes. As a consequence, in order to obtain a polyvinyl alcohol of uniform quality while carrying out the reaction continuously, it is necessary to use a continuous mixing device which effects a sufficiently uniform mixing in a very short time and then to transfer the mixture immediately to a saponifying device which can effectively handle the very viscous material as mixing and saponification are continued.

An apparatus in which this continuous mixing and saponifying operation may be effectively carried out is, as mentioned, shown in FIGS. 1 and 2 and is provided by combining the apparatus units disclosed in our copending applications Serial Numbers 643,418 and 643,419, filed March 1, 1957. Referring now to FIGS. 1 and 2, the apparatus may be seen to comprise a mixing unit 102 and a saponifier 110. As seen in FIG. 1, the mixing unit 102 has a cylindrical casing 101' with a cover 102', inlet lines 98 and 104 communicate with the interior of the upper portion of casing 101' which is divided into a plurality of chambers by a partition 104' which has a bell-shaped lower portion 105' forming a narrow annular passage between its peripheral edge and the inner wall of the casing 101'. Interiorly of the partition 104', is a second bell-shaped partition plate 106'. The inlet line 104 for the catalyst solution leads into the inner annular chamber defined between the partitions 104' and 105', whereas the inlet 98 for the polyvinyl acetate solution leads into the outer annular chamber defined between casing 101' and partition 104'. The vertical agitator shaft 108 extends axially into the casing 101' and is supported to be rotated at a high speed by any convenient driving means (not shown). The shaft 108 carries blades 108' and a disc 109'. Funnel-shaped guide walls or partition plates 110' and 111' are secured to the wall of casing 101' and direct the downwardly-mixing film of saponification mixture axially inwardly into contact with blades 108' and disc 109'. A discharge opening 112' is formed at the bottom of casing 101' and communicates directly with the inlet 125' of saponifier 110. The saponifier 110 is defined by a casing 121', a first screw 122' rotatably mounted in the casing on a shaft 123' connected to a driving pinion 124'. A delivery opening 126' is formed in the lower portion of the casing at the end opposite the inlet 125'. Cooperating with the screw 122' is a wiping and confining contact member which has surfaces which slide on the surfaces of screw 122' and effectively wipe them.

In this embodiment the confining contact member is in the form of a screw member 127'. A gear wheel 124a carried by the screw shaft 123a and gear wheel 124' secured to shaft 123' mesh with a common driving gear wheel 131 so that the parallel screws 122' and 127' cooperate and rotate in the same direction. The casing 101' is shaped to define intersecting cylinders which closely confine the screws 122' and 127' and the two screws also closely engage each other with as small a clearance as possible without impeding the desired relative movement.

When the mixer-saponifier assembly is in operation, the methanol solution of polyvinyl acetate is supplied through line 98 into casing 101' and the alkaline catalyst solution is fed through the line 104 into the inner chamber enclosed by the partition 104'. The polyvinyl acetate solution flows down in the form of thin film through the narrow annular slit between the outer peripheral edge of the partition portion 105' and the inner surface of the casing 101' and at the same time the catalyst solution flows down along the upper surface of the bell-shaped partition 106' as a thin layer and the two solutions then inter-mix and are guided inwardly by the guide plate 110' and are then thrown radially outwardly by the rotating blades 108' which are disposed beneath the opening of the funnel-shaped member 110'. The mixed solutions impinge upon the inner wall of the casing, and further intermix. The mixed solutions continue to flow downwardly and inwardly along the guide plate 111' and are thrown radially by revolving disc 109' and thus become uniformly mixed and finally flow from delivery opening 112'.

During the above operation, the two solutions are brought into intimate contact with each other and saponification is begun and, while the viscosity of solutions becomes lower, they are uniformly and effectively inter-mixed and the mixture is delivered through the outlet opening 112' to the saponifying device as the solution begins to increase in viscosity.

The mixture leaving outlet 112' enters through inlet 125' into the reaction casing, and is gradually conveyed to the outlet 126' by means of the screw 122' and screw-shaped contact member 127'. Since the screw 122' and the screw-shaped contact member 127' are arranged to rotate in the same direction as shown in FIG. 2, there is relative movement along the direction of the circumference of the screw in the wave-formed-curved portions forming the area of contact of the two parallel screws. As a result, there is provided an effective conveying, mixing and wiping action so that the solid, somewhat adhesive saponification product is effectively formed and conveyed continuously. The time necessary for the completion of reaction can be regulated simply by adjusting the number of revolutions of the screws. This time will vary with the mole ratio between the polyvinyl acetate and the catalyst and the temperature. The number of revolutions of the screws are selected to provide sufficient residence to produce a highly saponified product. The desired temperature is advantageously maintained by means of a steam jacket (not shown) or the like. It will be understood that the process may be carried out by means of other apparatus and the apparatus units shown in FIGS. 1 and 2 may, for example, have the modified forms shown in the drawings of the above-identified copending applications. Particularly good results, however, are obtainable with the apparatus shown in the accompanying drawings.

It will be understood that any of the usual catalysts for polyvinyl alcohol production may be employed and the invention is not limited to sodium hydroxide although this catalyst is particularly efficacious. The alkaline catalyst solution may also contain small amounts of sodium carbonate, e.g. about 1.5% or sufficient to saturate the solution. The amount of methanol used is, of course, at least sufficient to react with all of the acetyl groups in the polyvinyl acetate treated.

The process of the present invention will be more fully understood by reference to the following specific examples.

*Example 1*

A "paste" of 22% by weight of polyvinyl acetate in methanol produced by polymerization of vinyl acetate by any convenient process is mixed with methanol in mixing zone 96 in the proportion of 0.1 part of methanol per part of paste and the resultant mixture is fed continuously, together with a 23% aqueous solution of sodium hydroxide, into mixing zone 102. The paste is supplied at the rate of 260 parts per hour and the alkali solution is fed at the rate of 13.7 parts per hour. After passing through the mixing and blending zone 102 in the course of 0.1 minute, the resultant mixture is continuously introduced into the saponification zone 110 maintained at a temperature of 40° C. Passage through the saponification zone requires 3 minutes and the crude saponification product issuing from the zone contains polyvinyl alcohol which is 99.5% saponified.

*Example 2*

The polyvinyl acetate "paste" employed in Example 1 is mixed with methanol in the proportion of 0.1 part of methanol per part of paste and the resultant mixture is fed continuously, together with a 23% aqueous solution of sodium hydroxide, into mixing zone 102. The paste is supplied at the rate of 4000 parts per hour and the alkali solution is fed at the rate of 92 parts per hour. After passing through the mixing and blending zone 102 in the course of 0.1 minute, the resultant mixture is continuously introduced into the saponification zone 110 maintained at a temperature of 40° C. Passage through the saponification zone requires 3 minutes and the crude saponification product issuing from the zone contains polyvinyl alcohol which is 99.5% saponified.

*Example 3*

The polyvinyl acetate paste described in Example 1 is fed continuously, together with a 23% aqueous solution of sodium hydroxide, into mixing zone 102. The paste is supplied at the rate of 1680 parts per hour and the alkali solution is fed at the rate of 34 parts per hour. After passing through the mixing and blending zone 102 in the course of 0.1 minute, the resultant mixture is continuously introduced into the saponification zone 110 maintained at a temperature of 45° C. Passage throught the saponification zone requires 5 minutes and the crude saponification product issuing from the zone contained polyvinyl alcohol which is 99.5% saponified.

*Example 4*

Again using the polyvinyl acetate paste referred to in Example 1, the paste is mixed with methanol in the proportion of 0.5 part of methanol per part of paste and the resultant mixture is fed continuously, together with a 23% aqueous solution of sodium hydroxide containing 1% of sodium carbonate, into mixing zone 102. The paste is supplied at the rate of 4300 parts per hour, the sodium carbonate thus being fed at the rate of 2.6 parts per hour. After passing through the mixing and blending zone 102 in the course of 0.1 minute, the resultant mixture is continuously introduced into the saponification zone 110 maintained at a temperature of 50° C. Passage through the saponification zone requires 21 minutes and the crude saponification produce issuing from the zone contains polyvinyl alcohol which is 99.2% saponified.

In each of the foregoing examples, the polyvinyl acetate solution and the catalyst solution are initially disposed in the form of downwardly-flowing thin layers or films which are brought together in this form and the mixed films are then repeatedly dispersed and flow down downwardly inclined surfaces while in the form of thin layers or films. The polyvinyl acetate becomes partially saponified in this part of the process and tends to increase in viscosity. While, however, it is still readily flowable, it passes into the saponification zone proper and it is propelled with continued mixing over surfaces which are continuously wiped and, when saponification has reached the high percentage of conversion indicated, the saponification mass is discharged from the saponification zone.

While, as previously indicated, the polyvinyl acetate subjected to saponification may be prepared in any convenient manner in accordance with known techniques, a particularly suitable process is described in the application of Tsuguo Kominami being filed on even date herewith. Similarly, while the subsequent treatment of the saponification mass to produce dry polyvinyl alcohol product may be effected in any convenient manner in accordance with known procedures in this art, a particularly effective processing scheme is described in said application of Tsuguo Kominami.

It will be understood that various changes and modifications may be made without departing from the scope of the invention as defined in the appended claims. It is intended, therefore, that all matter contained in the foregoing description and in the drawing is to be interpreted as illustrative only and not as limitative of the invention.

This application includes subject matter disclosed in prior copending application Serial No. 643,418, filed March 1, 1957, now abandoned, and in copending application Serial No. 643,419, filed March 1, 1957.

What we claim and desire to secure by Letters Patent is:

1. A method for the preparation of polyvinyl alcohol by the saponification of polyvinyl acetate which comprises adding a methanol solution of polyvinyl acetate containing from about 10 to about 70 percent by weight of polyvinyl acetate to the top of a mixing zone, forming said methanol solution of polyvinyl acetate into a thin film and passing said thin film downwardly through said mixing zone, simultaneously adding from about 0.001 to about 0.25 mol percent by weight of polyvinyl acetate of an alkali metal hydroxide in a solvent selected from the group consisting of water and methanol into the top of said mixing zone, forming a thin layer of said alkali metal hydroxide solution, bringing said solutions of polyvinyl acetate and alkali metal hydroxide into contact with each other, mixing and dispersing the two solutions by impinging said solutions on an inner wall of said mixing zone, flowing said solutions down inclined paths and agitating said solutions as they move downwardly through said mixing zone to form a uniform mixture of said solutions, whereby saponification of the polyvinyl acetate is initiated, while the mixture is still flowable passing said mixture from the mixing zone and into a communicating enclosed saponification zone having an outlet end, conveying with concurrent positive propulsion said mixture to the outlet end of the saponification zone with continuous mixing of the components of the mixture over rotating surfaces, continuously removing the mixture from said rotating surfaces to prevent adherence of the mixture to said surfaces and to assure smooth flow of the mixture in the direction of the outlet end, wherein the mixture as it moves toward said outlet end is saponified and becomes solid and adhesive, and discharging from said outlet end a substantially completely saponified mass of polyvinyl alcohol.

2. The method of claim 1 wherein the solvent for said alkali metal hydroxide is water.

3. The method of claim 1 wherein the solvent for said alkali metal hydroxide is methanol.

4. The method of claim 1 wherein the alkali metal hydroxide is sodium hydroxide.

5. The method of claim 1 wherein the methanol solution of polyvinyl acetate contains from about 15–30 percent by weight of polyvinyl acetate.

References Cited in the file of this patent

UNITED STATES PATENTS

| | | |
|---|---|---|
| 1,897,856 | Noller | Feb. 14, 1933 |
| 2,048,286 | Pease | July 21, 1936 |
| 2,642,419 | Waugh et al. | June 16, 1953 |
| 2,729,549 | Reman | Jan. 3, 1956 |
| 2,779,752 | Vining | Jan. 29, 1957 |

UNITED STATES PATENT OFFICE
CERTIFICATE OF CORRECTION tent No. 3,072,624 January 8, 1963

Michijiro Akaboshi et al.

It is hereby certified that error appears in the above numbered patent requiring correction and that the said Letters Patent should read as corrected below.

Column 1, lines 21 to 25, the lower portion of the equation should appear as shown below instead of as in the patent:

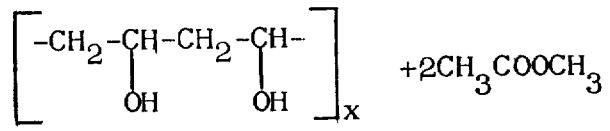

Signed and sealed this 17th day of December 1963.

(SEAL)
Attest:
ERNEST W. SWIDER

Attesting Officer

EDWIN L. REYNOLDS
Acting Commissioner of Patents